July 3, 1945.  W. K. McIVER  2,379,732

ALTERNATING CURRENT VERNIER MOTOR

Filed June 20, 1944

Inventor:
William K. McIver,
by Harry E. Dunham
His Attorney.

Patented July 3, 1945

2,379,732

UNITED STATES PATENT OFFICE 2,379,732

ALTERNATING CURRENT VERNIER MOTOR

William K. McIver, Fort Wayne, Ind., assignor to General Electric Company, a corporation of New York Application June 20, 1944, Serial No. 541,221

4 Claims. (Cl. 172—275)

My invention relates to a slow speed, self-starting synchronous motor of the vernier type. Its object is to provide such a motor of low inertia and good torque which is economical in cost and in operation.

Figure 3:
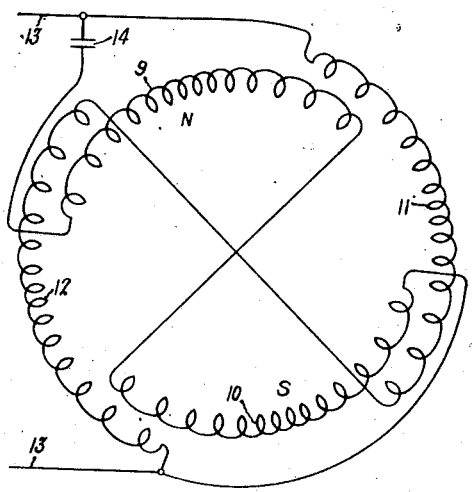
Figure 5:
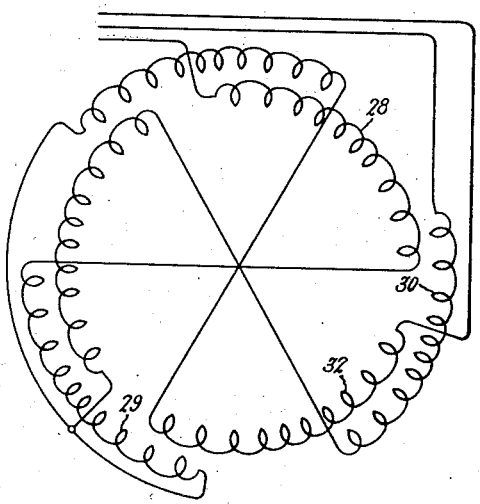
Figure 4:
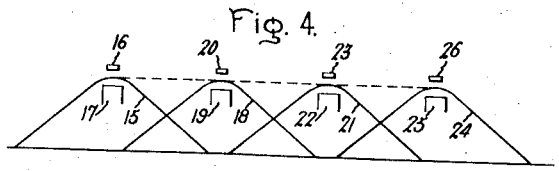

The features of my invention which are believed to be novel and patentable will be pointed out in the claims appended hereto. For a better understanding of my invention, reference is made in the following description to the accompanying drawing which shows in Fig. 1 an end view of the magnetic structure of the motor; Fig. 2 shows a cross-sectional view of Fig. 1 taken on line 2—2; Fig. 3 represents a split-phase winding for the motor; Fig. 4 shows flux curves explanatory of the split-phase motor flux distribution; and Fig. 5 represents a three-phase winding for the motor of Fig. 1.

Figure 1:
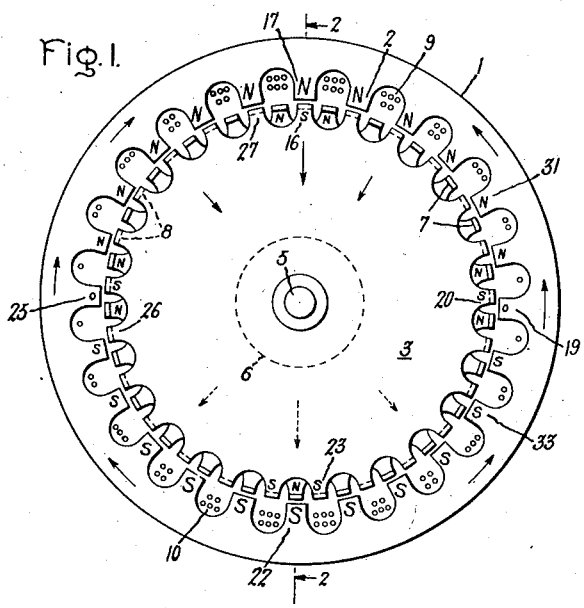
Figure 2:
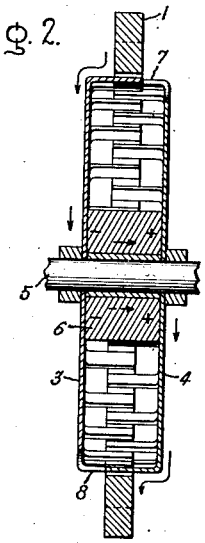

In Figs. 1 and 2, I have shown the magnetic circuit of a motor embodying my invention with polarity marks on the stator teeth corresponding to two-pole winding operation at a given instant. The stator comprises a magnetic core part 1 represented as having 24 teeth 2, with intervening coil slots uniformly spaced. The core may be laminated but for small motors a solid core part may be used. The rotor comprises two magnetic end plates 3 and 4 mounted on a shaft 5, with a cylindrical permanent magnet 6 between and abutting the end plates, polarizing them at opposite polarity. Suitable bushings are used as required to hold securely the rotor parts in position. The shaft 5 passes concentrically through the end plates and permanent magnet. The outer peripheries of the end plates are provided with teeth 7 which are bent inwardly at right angles. The teeth in each end plate are evenly spaced, are equal in number in the two rotor parts, and the teeth of one plate lie between the teeth of the other plate or are interleaved with a uniform spacing between them. The rotor represented has 50 teeth, half of them polarized with a plus polarity and the other half with a negative polarity, with the plus and negative teeth alternating with each other. A portion of the rotor teeth in Fig. 1 have polarity marks N and S indicated thereon to designate positive and negative polarity produced by the permanent magnet 6. All rotor teeth are thus polarized. The end plates are preferably made of low hysteresis, high permeability material.

Assume now that the stator of Fig. 1 has on it a two-pole, split-phase winding such as is represented in Fig. 3, with coil 9 corresponding to one pole of the condenser phase distributed in the upper twelve slots, coil 10 corresponding to the opposite pole of the condenser phase centrally distributed in the lower twelve slots, coil 11 corresponding to one pole of the other phase centrally distributed in the right twelve slots and coil 12 the reverse pole of such other phase centrally distributed in the left twelve slots. These windings are connected in parallel to a single-phase source 13 with a phase splitting condenser 14 in the condenser phase.

These coils while distributed and overlapping have the greater number of turns at the centers of the four poles. That is, coil 9 is centered with respect to the upper stator tooth and has the most turns about such tooth, less turns about the next two adjacent teeth, and so on, with the least number of turns about the teeth which are spaced fifth from the top tooth in both directions. This produces a pole flux having increasing intensity toward the center and assuming that such top winding 9 is now producing a north pole flux, the intensity distribution thereof will be somewhat as indicated by the size of the designations N on the stator teeth. At the same time the lower coil 10 will be producing a south pole flux having a centrally concentrated distribution somewhat as represented by the size of the designations S on the lower stator poles. Thus, the polarity designations on the stator teeth represent maximum current in coils 9 and 10 and none in the other phase coils 11 and 12. The small circles in the slots of the stator for the upper and lower poles may represent the relative number of coil turns for the distribution of coils 9 and 10 respectively. Similarly, coil windings 11 and 12 will be distributed in the twelve slots on the right and left respectively with their concentrated centers at the teeth designated 0 in Fig. 1, indicating that at the instant assumed these teeth have zero stator flux. When the winding is completed, all slots may carry an equal number of conductors but conductors for only coils 9 and 10 have been represented in Fig. 1 so as more clearly to indicate the character of the winding arrangement. I term this type of winding a distributed concentrated center coil winding. It will now be evident that with a flux distribution indicated by the N and S polarity designations on the stator teeth of Fig. 1, the polarized rotor will take the rotary position represented where the south pole teeth of the rotor are in best alignment with the north pole stator teeth, and the north pole rotor teeth are in best alignment with the south pole stator teeth, with the extent of such alignment at different teeth varying approximately in proportion to the magnitude of the stator fluxes at such teeth.

Thus it is seen that the upper and lower rotor teeth are in exact alignment with the upper and lower stator teeth, while this perfection in alignment decreases until at the sides the north and south pole teeth of the rotor are equally out of line with the stator teeth carrying zero stator flux at the instant assumed. Thus the rotor is in a position of minimum reluctance with respect to the fluxes existing, and any attempt to rotate the rotor from this position would require appreciable torque since all of the stator flux and most of the teeth in both stator and rotor are utilized in establishing this relation. If the rotor was not polarized, the rotor would also take such a tooth alignment position, but it would not be selective as to what particular rotor teeth would be pulled into best alignment with the stator teeth of a given polarity. The general flux path at the instant assumed is represented by arrows in Figs. 1 and 2.

In Fig. 4 let the approximately triangular curve 15 represents the stator flux distribution of winding 9 at the instant above assumed when the south pole tooth designated 16 is opposite stator tooth designated 17. One-quarter cycle later coil 11 will produce a similar north pole flux distribution 18 centered about stator tooth designated 19 and will pull south rotor tooth designated 20 into alignment therewith. One-quarter cycle later flux distribution represented by 21 will be centered at stator tooth 22. Since this was formerly a south pole and the current has reversed, it now has a north pole flux as represented, and will pull south pole tooth designated 23 into alignment therewith. One-quarter cycle later a north pole flux 24 will be centered about stator tooth 25 and will pull south pole rotor tooth 26 into alignment therewith. One-quarter cycle later a north pole flux will again be centered at stator tooth 17 and will draw south pole tooth 27 into alignment therewith. Meanwhile a similar action has taken place with respect to the south pole stator flux and north pole rotor teeth at opposite diameters of the machine, and the stator flux transition between the quarter-cycle times assumed is also helpful in maintaining the rotor in synchronous rotation because for example the flux of winding 9 and its stator teeth of a given polarity dies down as the flux of winding 11 and its stator teeth of the same polarity increases to a maximum so that there is a progressive shifting of the flux of a given polarity about the stator that pulls selected polarized rotor teeth along with it. As a result of this action the rotor rotates one full rotor tooth of a given polarity per cycle in the direction of stator field rotation. The particular motor represented would rotate one revolution in 25 cycles, or 144 R. P. M. on 60 cycles and 960 R. P. M. on 400 cycles. The rotor is sufficiently light in inertia that the motor is self-starting and the direction of rotation may be selected by selecting the direction of stator flux rotation. For example, with the winding of Fig. 3 the direction of rotation may be changed by shifting the condenser to the circuit of coils 11 and 12.

In Fig. 5 is represented a three-phase, two-pole winding that may be substituted on the stator, Fig. 1. The coils in one phase belt for the opposite poles such as coils 28 and 29 will be diametrically opposite each other. The coils for the other phase belts will be spaced from coils 28 and 29 by 60 and 120 degrees. Thus, if the center of coil 28 is at stator tooth 17, the center of coil 30 will be at tooth 31 and the center of coil 32 will be at tooth 33. The coils will overlap with the most turns per coil about the center tooth as with the two-phase winding, and the closer spacing of the turns at the centers of the coils is to represent such concentration. The spread of the three-phase coils will preferably be less than with the two-phase winding. Thus coil 28 with its center at tooth 17 may have a maximum spread of seven stator teeth.

The shifting of the flux progresses as before except that the shift steps will be shorter in cycle time and in distance about the stator. Thus tooth 31 will have maximum flux of a given polarity of one-sixth cycle after tooth 17 has maximum flux of the same polarity. The speed will be the same as before and the three-phase motor will develop a slightly smoother and greater synchronous torque. The direction of rotation may be reversed by reversing any two phases of the motor.

There are other combinations of stator and rotor teeth that will utilize the principles described. For example, it is obvious that I may increase the pole number from two to four or six, add corresponding additional numbers of coils and stator teeth, and so reduce the speed by one-third or one-half that previously mentioned.

It is also readily seen that instead of using 24 stator teeth and 50 rotor teeth in Fig. 1, I could use 24 stator teeth and 46 rotor teeth per pair of winding pole number. It is also evident that for a two-pole motor I could use a combination of 16 stator teeth and 34 or 30 rotor teeth; also 12 stator teeth and 26 or 22 rotor teeth; also 8 stator teeth and 18 or 14 rotor teeth. Hence, it is seen that the motor has four N stator teeth and the rotor eight N±2 stator teeth per pair of poles, where N is any full number greater than one.

It is also evident that with the two-pole, two-phase motor of Figs. 1 and 3, I could use an extreme phase belt span per pole of nine or seven teeth instead of eleven. This would reduce the useful area of stator and rotor but would still result in an operative motor with a decreased coil winding expense. I could also use a phase belt per pole span of thirteen stator teeth instead of eleven but with no gain in motor performance and at an added winding expense. Hence, the extreme coil or phase belt per pole pitch for the distributed concentrated center coils should be approximately but not greater than one less than the number of stator teeth per pair of poles divided by the number of phases, assuming that the number of phases is greater than one. If in Figs. 1 and 3, the motor be made single phase by omitting coils 11 and 12, the motor would operate synchronously at the same speed as for a polyphase motor but at reduced torque, and directional starting would need to be established by launching the rotor in the direction of rotation desired.

As shown in Fig. 1, the motor air-gap should be less than the spacing between rotor teeth so that the permanent magnet flux of the rotor can thread the stator and not be short-circuited at the rotor periphery. The rotor teeth should have a width between one-half and the full width of the stator teeth measured in a peripheral direction. It will be evident to those familiar with windings that the concentrated center distributed coil winding arrangement may be formed of coils which are all alike.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A polyphase multipolar self-starting synchronous motor having a magnetic stator core member with 4 N evenly spaced teeth per pair of motor poles, N being any full number greater than one, a magnetic rotor member cooperating with the stator member having 8 N + 2 evenly spaced teeth per pair of motor poles, means for polarizing alternate rotor teeth at opposite magnetic polarity, a polyphase multipolar winding on the stator core having distributed, concentrated center coils with an extreme stator tooth pitch per pole phase belt of approximately but not greater than one less than the number of stator teeth per pair of motor poles divided by the number of phases of the winding, said winding having the coils of different phases overlapping, the air gap between stator and rotor being less than the spacing between rotor teeth and the rotor teeth having a peripheral width which is between one-half and the full peripheral width of the stator teeth.

2. A polyphase multipolar self-starting synchronous motor having a magnetic stator core member with 4 N evenly spaced teeth per pair of motor poles, N being any full number greater than one, a magnetic rotor member cooperating with the stator member having 8 N—2 evenly spaced teeth per pair of motor poles, means for polarizing alternate rotor teeth at opposite magnetic polarity, a polyphase multipolar winding on the stator core having distributed, concentrated center wound coils with an extreme stator tooth pitch per pole phase belt of approximately but not greater than one less than the number of stator teeth per pair of motor poles divided by the number of phases of the winding, said winding having the coils of different phases overlapping, the air gap between stator and rotor being less than the spacing between rotor teeth and the rotor teeth having a peripheral width which is between one-half and the full peripheral width of the stator teeth.

3. A polyphase two-pole self-starting synchronous motor comprising cooperating stator and rotor magnetic core members, the stator having twenty-four evenly spaced teeth and the rotor having fifty evenly spaced teeth, permanent magnet means on the rotor for polarizing alternate rotor teeth at opposite magnetic polarity, a two-pole polyphase winding on the stator formed of distributed, concentrated center coils having an extreme stator tooth span of $$\frac{24}{N} - 1$$

where N is the number of phases of the winding, the coils in adjacent phase belts overlapping, said motor having an air gap which is less than the spacing between the rotor teeth, and said rotor teeth having a peripheral width between one-half and the full peripheral width of the stator teeth, said motor having a synchronous speed of two rotor teeth per cycle.

4. A two-phase two-pole self-starting synchronous motor comprising cooperating stator and rotor members, stator and rotor magnetic core members, the stator having twenty-four evenly spaced teeth and the rotor having fifty evenly spaced teeth, permanent magnet means on the rotor for polarizing alternate rotor teeth at opposite magnetic polarity, a two-pole two-phase winding on the stator formed by four evenly spaced distributed, concentrated center coils, each having an extreme stator tooth span of eleven teeth with each coil overlapping with two adjacent coils, said motor having an air gap less than the rotor tooth spacing and the rotor teeth having a peripheral width between one-half and the full peripheral width of the stator teeth, said motor having a synchronous speed of two rotor teeth per cycle.

WILLIAM K. McIVER.